(12) United States Patent
Chen et al.

(10) Patent No.: US 12,276,752 B2
(45) Date of Patent: Apr. 15, 2025

(54) IDENTIFICATION OF SPURIOUS RADAR DETECTIONS IN AUTONOMOUS VEHICLE APPLICATIONS

(71) Applicant: Waymo LLC, Mountain View, CA (US)

(72) Inventors: Xu Chen, Livermore, CA (US); Nichola Abdo, Mountain View, CA (US); Ruichi Yu, Mountain View, CA (US); Chang Gao, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 713 days.

(21) Appl. No.: 17/445,129

(22) Filed: Aug. 16, 2021

(65) Prior Publication Data

US 2023/0046274 A1 Feb. 16, 2023

(51) Int. Cl.
| | | |
|---|---|---|
| *G01S 7/41* | (2006.01) | |
| *B60W 60/00* | (2020.01) | |
| *G01S 13/86* | (2006.01) | |
| *G01S 13/931* | (2020.01) | |
| *G06F 18/24* | (2023.01) | |
| *G06F 18/25* | (2023.01) | |
| *G06T 7/20* | (2017.01) | |
| *G06V 20/56* | (2022.01) | |

(52) U.S. Cl.
CPC .......... *G01S 7/417* (2013.01); *B60W 60/001* (2020.02); *G01S 7/412* (2013.01); *G01S 13/867* (2013.01); *G01S 13/931* (2013.01); *G06F 18/24* (2023.01); *G06F 18/253* (2023.01); *G06T 7/20* (2013.01); *G06V 20/56* (2022.01); *B60W 2420/403* (2013.01); *B60W 2420/408* (2024.01); *B60W 2554/404* (2020.02); *G06T 2207/10044* (2013.01); *G06T 2207/20084* (2013.01); *G06T 2207/30252* (2013.01)

(58) Field of Classification Search
None
See application file for complete search history.

(56) References Cited

U.S. PATENT DOCUMENTS

| | | |
|---|---|---|
| 11,618,480 B2 | 4/2023 | Imran et al. |
| 2019/0147331 A1 | 5/2019 | Arditi |
| 2019/0147610 A1 | 5/2019 | Frossard et al. |

(Continued)

OTHER PUBLICATIONS

Sengupta A., et al., "A DNN-LSTM Based Target Tracking Approach using mmWave Radar and Camera Sensor Fusion," IEEE National Aerospace and Electronics Conference, 2019, pp. 688-693.

*Primary Examiner* — Whitney Moore
(74) *Attorney, Agent, or Firm* — Lowenstein Sandler LLP

(57) ABSTRACT

The described aspects and implementations enable fast and accurate verification of radar detection of objects in autonomous vehicle (AV) applications using combined processing of radar data and camera images. In one implementation, disclosed is a method and a system to perform the method that includes obtaining a radar data characterizing intensity of radar reflections from an environment of the AV, identifying, based on the radar data, a candidate object, obtaining a camera image depicting a region where the candidate object is located, and processing the radar data and the camera image using one or more machine-learning models to obtain a classification measure representing a likelihood that the candidate object is a real object.

20 Claims, 7 Drawing Sheets

(56) References Cited

U.S. PATENT DOCUMENTS

| | | |
|---|---|---|
| 2020/0127386 A1* | 4/2020 | Yekan .................... H01P 5/107 |
| 2020/0142026 A1* | 5/2020 | Bush .................... G05D 1/0248 |
| 2020/0175315 A1 | 6/2020 | Gowaikar et al. |
| 2021/0133582 A1* | 5/2021 | Refaat .................... G06N 3/09 |
| 2021/0406679 A1* | 12/2021 | Wen ....................... G06V 20/56 |
| 2022/0130109 A1 | 4/2022 | Arbabian et al. |
| 2022/0415059 A1* | 12/2022 | Smolyanskiy .... B60W 60/0027 |

\* cited by examiner

IDENTIFICATION OF SPURIOUS RADAR DETECTIONS IN AUTONOMOUS VEHICLE APPLICATIONS

TECHNICAL FIELD

The instant specification generally relates to autonomous vehicles. More specifically, the instant specification relates to improving autonomous driving systems and components using machine-learning models to classify radar returns as associated with actual or spurious objects in autonomous driving environments.

BACKGROUND

An autonomous (fully and partially self-driving) vehicle (AV) operates by sensing an outside environment with various electromagnetic (e.g., radar and optical) and non-electromagnetic (e.g., audio and humidity) sensors. Some autonomous vehicles chart a driving path through the environment based on the sensed data. The driving path can be determined based on Global Positioning System (GPS) data and road map data. While the GPS and the road map data can provide information about static aspects of the environment (buildings, street layouts, road closures, etc.), dynamic information (such as information about other vehicles, pedestrians, street lights, etc.) is obtained from contemporaneously collected sensing data. Precision and safety of the driving path and of the speed regime selected by the autonomous vehicle depend on timely and accurate identification of various objects present in the driving environment and on the ability of a driving algorithm to process the information about the environment and to provide correct instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which.

SUMMARY

Figure 1:
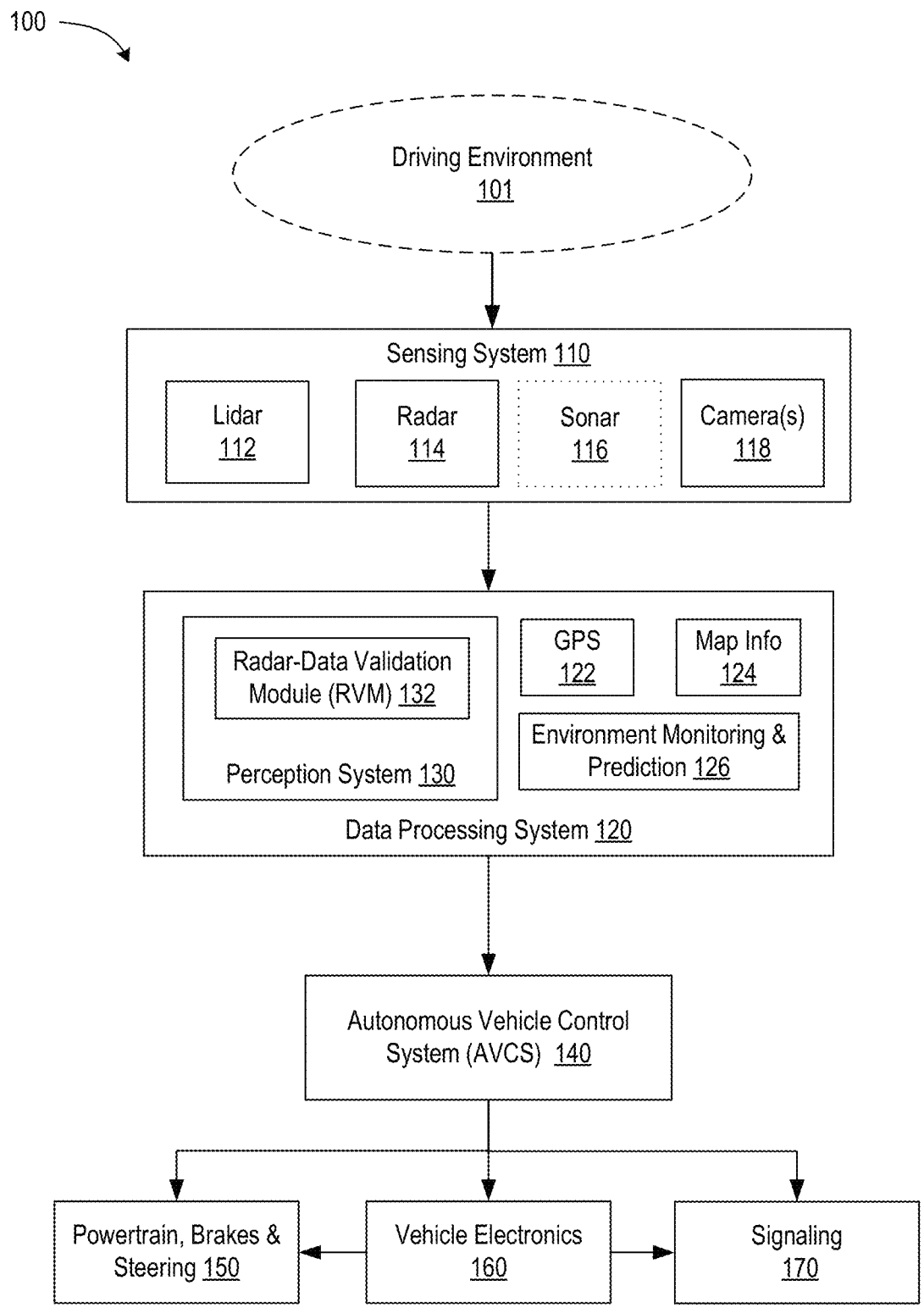
FIG. 1 is a diagram illustrating components of an example autonomous vehicle capable of combining radar data with camera data for fast and reliable verification of radar detections, in accordance with some implementations of the present disclosure.

In one implementation, disclosed is a system that includes a sensing system of an autonomous vehicle (AV), the sensing system configured to: obtain a radar data characterizing intensity of radar reflections from an environment of the AV; and obtain a camera image depicting a region of the environment of the AV. The disclosed system further includes a perception system of the AV, the perception system configured to: identify, based on the radar data, a candidate object in the environment of the AV, wherein the candidate object is located within the region of the environment of the AV; and process the radar data and the camera image using one or more machine-learning models (MLMs) to obtain a classification measure representing a likelihood that the candidate object is a real object in the environment of the AV.

In another implementation, disclosed is a system of that includes system that includes a sensing system of an autonomous vehicle (AV), the sensing system configured to: obtain a radar data characterizing intensity of radar reflections from an environment of the AV; and obtain a camera image depicting a region of the environment of the AV. The disclosed system further includes a perception system of the AV, the perception system configured to: identify, based on the radar data, a first candidate object and a second candidate object within the region of the environment of the AV; and process the radar data and the camera image using one or more machine-learning models (MLMs) to determine that the first candidate object is a real object in the environment of the AV and that the second candidate object is a spurious object in the environment of the AV.

In another implementation, disclosed is a method that includes: obtaining, by a processing device, a radar data characterizing intensity of radar reflections from an environment of an autonomous vehicle (AV); identifying, by the processing device, based on the radar data, a candidate object in the environment of the AV; obtaining, by the processing device, a camera image depicting a region where the candidate object is located; and processing the radar data and the camera image using one or more machine-learning models (MLMs) to obtain a classification measure representing a likelihood that the candidate object is a real object in the environment of the AV.

DETAILED DESCRIPTION

An autonomous vehicle can employ a radio detection and ranging (radar) technology and light detection and ranging (lidar) technology to detect distances to various objects in the environment and the velocities of such objects. A sensor (a radar or lidar) emits one or more radio wave (or laser) signals (e.g., pulses) that travel to an object and then detects arrived signals reflected from the object. By determining a time delay between the signal emission and the arrival of the reflected waves, a sensor can determine the distance to the object. A typical sensor emits signals in multiple directions to obtain a wide view of the outside environment. For example, a sensor (radar or lidar) can cover an entire 360-degree view by using a series of consecutive sensing frames identified with timestamps. As a result, each sector in space is sensed in time increments $\Delta T$, which are determined by the angular velocity of the sensor's scanning speed. Sometimes, an entire 360-degree view of the environment can be obtained over a full scan. Alternatively, any smaller sector, e.g., a 1-degree sector, a 5-degree sector, a 10-degree sector, or any other sector can be scanned, as desired.

Each frame can include numerous return points (or simply "points") corresponding to reflections from various objects of the environment. Each point can be associated with the distance to the corresponding object or, more specifically, with the distance to an element of the reflective surface of the object (reflecting region) responsible for the respective return point. A set of points within a given frame can be referred to as a "point cloud." A point cloud can include returns from multiple objects. Typically, it is not known a priori how many objects are within a given frame and to what types (e.g., cars, trucks, buses, motorcycles, pedestrians, road signs, trees, etc.) the objects in the frame belong.

Time-of-flight (ToF) sensors are typically used for ranging. ToFs can also be capable of determining the velocity (speed and direction of motion) of a return point by emitting two or more signals (e.g., as part of different sensing frames) in a quick succession and detecting the position of the reflecting surface as the surface moves with each additional frame. The intervals between successive signals (frames) can be short enough so that the object does not change its position appreciably in relation to other objects of the environment, but still long enough to allow the radar or lidar to detect accurately the changes in the object's position. Coherent sensors, e.g., frequency-modulated continuous wave (FMCW) radars and/or lidars take advantage of a phase information encoded into transmitted signals (and carried by the emitted electromagnetic waves to the target and back) and provide additional functionality. A coherent sensor detects changes in the frequency (and the accompanying phase) of the reflected wave induced by the motion of the reflecting surface, a phenomenon known as the Doppler effect. The frequency/phase of the reflected wave is sensitive to the component of the velocity of the reflecting surface $V_r$ that is parallel to the direction of the wave propagation, herein referred to as the "radial" velocity. A coherent sensor allows to associate a radial velocity with the return points of the point cloud. This additional information (which can be obtained separately or together with the range information) helps the sensing system of the autonomous vehicle to identify the state of the motion of various objects.

Radar sensors are inexpensive, require moderate amount of maintenance, have a large working range of distances, and possess a good tolerance of adverse environmental conditions, e.g., foggy, snowy, or misty driving conditions. Because of a low cost and complexity of radar sensors, multiple radar devices can be mounted on a vehicle and positioned at locations that collectively provide a wide field of view. As a result, even when a view from a single lidar sensor mounted in the middle of the roof of a vehicle is obscured by an obstacle (e.g., a doubly parked car or truck), other radar sensors, e.g., mounted on rear-view mirrors can still provide a good view into the obscured portion of the roadway. Precision of radar returns, however, can be limited by a relatively long wavelength, as compared with the wavelength of light used by optical lidar technology. More specifically, angular resolution of radar returns can be diffraction-limited, with resolution of about 1° achieved by typical systems mounted on autonomous vehicles. Such a resolution amounts to lateral distance of about 1.7 m at a range of 100 m. As a result, radar reflections from an object (e.g., a vehicle) can include as few as several return points (or even just one return point) and may not be capable of identifying a shape of the object with a high accuracy. Additionally, unlike optical signals, which are more efficiently absorbed and scattered by various materials, radar signals can experience reflection (or even multiple reflections) from much more diverse classes of surfaces and objects. Accordingly, false radar returns can be generated by reflections of radar signals by buildings, structures, vehicles, and other objects. Furthermore, low frequency of radar signals means that generation and transmission of such signals may be affected by noise, e.g., thermal noise. While reduction of thermal noise can be achieved by lowering the temperature of the radar emitter, this may not be very practical to implement in realistic vehicles and driving environments. Moreover, noise present in radar signals can be further confounded by reflections from multiple objects of the driving environment and can result in a substantial number of false radar detections. A non-existent object falsely detected by the autonomous vehicle can cause the vehicle to brake suddenly or perform some other unnecessary driving action (e.g., a steering maneuver) that can negatively affect safety and ride comfort of the autonomous vehicle as well as safety of other people and vehicles.

Aspects and implementations of the present disclosure address these and other shortcomings of the existing radar detection technology by enabling methods and systems that reliably and quickly identify false radar returns as spurious non-objects. This allows faster and more accurate identification and tracking of objects in driving environments. Various implementations of the present disclosure describe an object identification and tracking system that uses one or more machine-learning models (MLMs) to identify a content of the driving environment. Input to the MLMs can include detailed radar data, such as low-level semantic data, e.g., intensity data I and Doppler frequency shift data $\Delta f$. The one or more MLMs can use camera image data as an additional input. A camera (e.g., a photographic or video camera) provides a complementary (to the radar) view of the driving environment using wavelengths that are different from the wavelength of the radar. Camera data can confirm the existence of actual objects at locations of real radar returns and can identify as spurious various artifact returns that are caused by radar noise and reflections. In some implementations, separate MLMs (or portions of the same MLM) can be trained to process the radar data and the camera data to obtain radar and camera feature maps of the environment. The radar and camera feature maps can then be fused processed by a final prediction (classifier) fusion MLM to determine the likelihood that the radar detection is genuine or spurious. Advantages of the described implementations include fast and accurate classification of radar returns to facilitate efficient object identification in autonomous vehicle applications. Such improved perception of autonomous vehicles translates into safer, more comfortable, and more fuel-efficient autonomous driving.

FIG. 1 is a diagram illustrating components of an example autonomous vehicle (AV) 100 capable of combining radar data with camera data for fast and reliable verification of radar detections, in accordance with some implementations of the present disclosure. Autonomous vehicles can include motor vehicles (cars, trucks, buses, motorcycles, all-terrain vehicles, recreational vehicles, any specialized farming or construction vehicles, and the like), aircraft (planes, helicopters, drones, and the like), naval vehicles (ships, boats, yachts, submarines, and the like), or any other self-propelled vehicles (e.g., robots, factory or warehouse robotic vehicles, sidewalk delivery robotic vehicles, etc.) capable of being operated in a self-driving mode (without a human input or with a reduced human input).

A driving environment 101 can include any objects (animated or non-animated) located outside the AV, such as roadways, buildings, trees, bushes, sidewalks, bridges, mountains, other vehicles, pedestrians, and so on. The driving environment 101 can be urban, suburban, rural, and so on. In some implementations, the driving environment 101 can be an off-road environment (e.g. farming or other agricultural land). In some implementations, the driving environment can be an indoor environment, e.g., the environment of an industrial plant, a shipping warehouse, a hazardous area of a building, and so on. In some implementations, the driving environment 101 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 101 can be located at any distance from the AV, from close distances of several feet (or less) to several miles (or more).

The example AV 100 can include a sensing system 110. The sensing system 110 can include various electromagnetic (e.g., optical) and non-electromagnetic (e.g., acoustic) sensing subsystems and/or devices. The sensing system 110 can include a radar 114 (or multiple radars 114), which can be any system that utilizes radio or microwave frequency signals to sense objects within the driving environment 101 of the AV 100. The radar(s) 114 can be configured to sense both the spatial locations of the objects (including their spatial dimensions) and velocities of the objects (e.g., using the Doppler shift technology). Hereinafter, "velocity" refers to both how fast the object is moving (the speed of the object) as well as the direction of the object's motion. The sensing system 110 can include a lidar 112, which can be a laser-based unit capable of determining distances to the objects and velocities of the objects in the driving environment 101. Each of the lidar 112 and radar 114 can include a coherent sensor, such as a frequency-modulated continuous-wave (FMCW) lidar or radar sensor. For example, radar 114 can use heterodyne detection for velocity determination. In some implementations, the functionality of a ToF and coherent radar is combined into a radar unit capable of simultaneously determining both the distance to and the radial velocity of the reflecting object. Such a unit can be configured to operate in an incoherent sensing mode (ToF mode) and/or a coherent sensing mode (e.g., a mode that uses heterodyne detection) or both modes at the same time. In some implementations, multiple radars 114 and/or lidars 112 can be mounted on AV 100.

Radar 114 can include one or more radio/microwave sources producing and emitting signals and one or more detectors of the signals reflected back from the objects. In some implementations, radar 114 (or multiple radars 114) can perform a 360-degree scanning in a horizontal direction. In some implementations, radar(s) 114 can be capable of spatial scanning along both the horizontal and vertical directions. In some implementations, the field of view can be up to 90 degrees in the vertical direction (e.g., with at least a part of the region above the horizon being scanned with radar signals). In some implementations, the field of view can be a full sphere (consisting of two hemispheres).

The sensing system 110 can further include one or more cameras 118 to capture images of the driving environment 101. The images can be two-dimensional projections of the driving environment 101 (or parts of the driving environment 101) onto a projecting surface (flat or non-flat) of the camera(s). Some of the cameras 118 of the sensing system 110 can be video cameras configured to capture a continuous (or quasi-continuous) stream of images of the driving environment 101. The sensing system 110 can also include one or more sonars 116, which can be ultrasonic sonars, in some implementations.

The sensing data obtained by the sensing system 110 can be processed by a data processing system 120 of AV 100. For example, the data processing system 120 can include a perception system 130. The perception system 130 can be configured to detect and track objects in the driving environment 101 and to recognize the detected objects. For example, the perception system 130 can analyze images captured by the cameras 118 and can be capable of detecting traffic light signals, road signs, roadway layouts (e.g., boundaries of traffic lanes, topologies of intersections, designations of parking places, and so on), presence of obstacles, and the like. The perception system 130 can further receive radar sensing data (Doppler data and ToF data) to determine distances to various objects in the environment 101 and velocities (radial and, in some implementations, transverse, as described below) of such objects. In some implementations, the perception system 130 can use radar data in combination with the data captured by the camera(s) 118, as described in more detail below.

The perception system 130 can include one or more modules to facilitate validation (verification) of radar detections using camera data, including a radar-data validation module (RVM) 132 that can be used to process data provided by the sensing system 110, including images from camera(s) 118 and a radar data (both processed return points and low-level semantic data) from radar 114. More specifically, in some implementations, RVM 132 can use at least some or all of the following data generated by radar 114: 1) high-level radar data that includes a list of radar returns (return points) representing a list of potential real or spurious object; 2) a low-level radar intensity and Doppler data that can include an entire radar frame or selected portions of the radar frame; and 3) camera image(s) of the driving environment. RVM 132 can include one or more trained models that are used to process some or all of the above data to classify the radar returns as genuine or spurious. In some implementations, RVM 132 can further provide confidence levels representing estimates of the reliability of the output classifications. Various models of RVM 132 can be trained using multiple annotated camera images and multiple sets of radar data, to identify specific camera and radar features in the respective images/data associated with genuine and false objects.

The perception system 130 can further receive information from a positioning subsystem (not shown in FIG. 1), which can include a GPS transceiver (not shown), configured to obtain information about the position of the AV relative to Earth and its surroundings. The positioning subsystem can use the positioning data, e.g., GPS and IMU data) in conjunction with the sensing data to help accurately determine the location of the AV with respect to fixed objects of the driving environment 101 (e.g. roadways, lane boundaries, intersections, sidewalks, crosswalks, road signs, curbs, surrounding buildings, etc.) whose locations can be provided by map information 135. In some implementations, the data processing system 120 can receive non-electromagnetic data, such as audio data (e.g., ultrasonic sensor data, or data from a mic picking up emergency vehicle sirens), temperature sensor data, humidity sensor data, pressure sensor data, meteorological data (e.g., wind speed and direction, precipitation data), and the like.

The data processing system 120 can further include an environment monitoring and prediction component 126, which can monitor how the driving environment 101 evolves with time, e.g., by keeping track of the locations and velocities of the animated objects (e.g., relative to Earth). In some implementations, the environment monitoring and prediction component 126 can keep track of the changing appearance of the environment due to a motion of the AV relative to the environment. In some implementations, the environment monitoring and prediction component 126 can make predictions about how various animated objects of the driving environment 101 will be positioned within a prediction time horizon. The predictions can be based on the current locations and velocities of the animated objects as well as on the tracked dynamics of the animated objects during a certain (e.g., predetermined) period of time. For example, based on stored data for object 1 indicating accelerated motion of object 1 during the previous 3-second period of time, the environment monitoring and prediction component 126 can conclude that object 1 is resuming its motion from a stop sign or a red traffic light signal. Accordingly, the environment monitoring and prediction component 126 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, the environment monitoring and prediction component 126 can conclude that object 2 is stopping at a stop sign or at a red traffic light signal. Accordingly, the environment monitoring and prediction component 126 can predict where object 2 is likely to be within the next 1 or 3 seconds. The environment monitoring and prediction component 126 can perform periodic checks of the accuracy of its predictions and modify the predictions based on new data obtained from the sensing system 110. The environment monitoring and prediction component 126 can operate in conjunction with RVM 134. Although not depicted explicitly in FIG. 1, in some implementations, RVM 134 can be integrated into the environment monitoring and prediction component 126.

The data generated by the perception system 130, the GPS data processing module 122, and the environment monitoring and prediction component 126 can be used by an autonomous driving system, such as AV control system (AVCS) 140. The AVCS 140 can include one or more algorithms that control how AV is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain, brakes, and steering 150, vehicle electronics 160, signaling 170, and other systems and components not explicitly shown in FIG. 1. The powertrain, brakes, and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain, brakes, and steering 150 (or signaling 170) whereas other instructions output by the AVCS 140 are first delivered to the vehicle electronics 160, which generates commands to the powertrain, brakes, and steering 150 and/or signaling 170.

In one example, camera 118, radar 114, or lidar 112 can determine that the path ahead is blocked by a doubly parked truck. The AVCS 140 can cause the AV 100 to nudge to the left closer to the median separating the lane occupied by the AV 100 from the oncoming traffic lane. Radar 114 can acquire data that includes a number of returns from a candidate object located within the oncoming traffic lane. Camera 118 can acquire an image of the region of the oncoming traffic lane that became visible after the nudging maneuver. The camera image and the radar data can be input into RVM 134 that can classify, e.g., with 90% probability, the object in the oncoming traffic lane is a real object. Based on this classification and using the velocity radar data, the perception system 130 can further determine the velocity of the object to be 38 mph and the bus to be at 110 yards from the doubly parked truck. The data processing system 120 can, therefore, determine that the object is to pass the doubly parked car in about 6 seconds, the time that is too short to safely drive around the doubly parked truck. Using the determination made by the data processing system 120, the AVCS 140 can output instructions to powertrain, brakes and steering 150 to stop the AV and wait for the bus to clear the oncoming traffic lane. Alternatively, in the same example, RVM 134 can determine that the candidate object in the oncoming traffic lane is a spurious radar return. The spurious return can be originally produced by a bus (e.g., that is in the oncoming traffic lane but already behind the AV) and then reflected off the back of the doubly parked truck. Based on this determination, the AVCS 140 can output instructions to powertrain, brakes and steering 150 to drive around the doubly parked truck.

Figure 2:
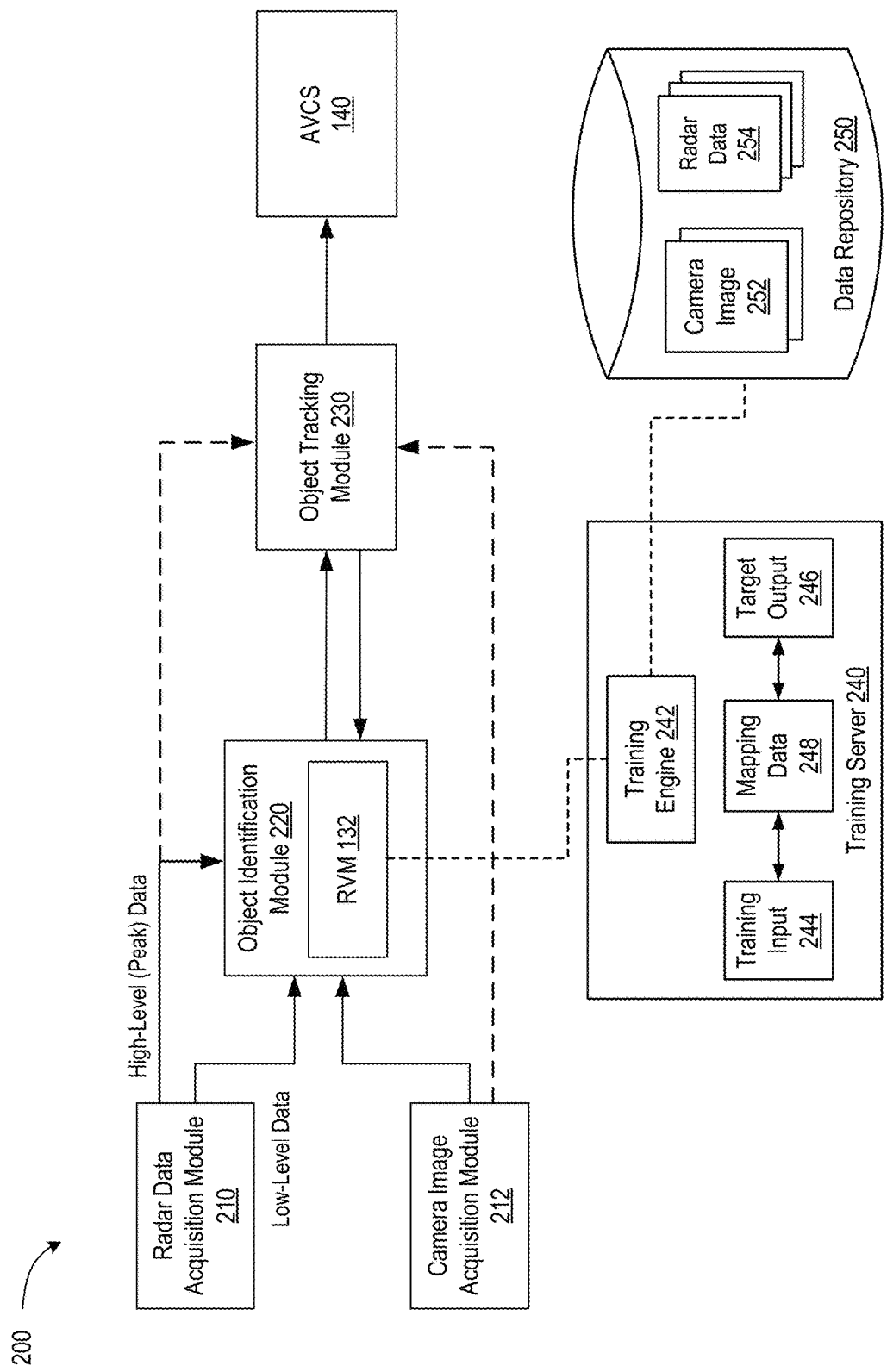
FIG. 2 is a diagram illustrating example architecture of a part of a perception system of an autonomous vehicle that is capable of using camera images for validation of objects detected with radar data, in accordance with some implementations of the present disclosure.

FIG. 2 is a diagram illustrating example architecture 200 of a part of a perception system of an autonomous vehicle that is capable of using camera images for validation of objects detected with radar data, in accordance with some implementations of the present disclosure. An input into the perception system (e.g., perception system 130 of FIG. 1) can include data obtained by sensing system 110 (e.g., radar 114 and camera 118), such as distance data, radial velocity data, camera pixel data, etc. For example, a radar data acquisition module 210 can provide both a high-level radar data and a low-level radar data. The low-level data can include the radar intensity map $I(x_1,x_2,x_3)$, where $\{x_j\}$ is a set of coordinates, e.g., spherical coordinates R, θ, ϕ or Cartesian coordinates x, y, z, or any other suitable coordinates (e.g., elliptic coordinates, parabolic coordinates, etc.). The radar intensity map identifies an intensity of the radar reflections for various points in the field of view of the radar. The coordinates of objects (or surfaces of the objects) that reflect radar signals can be determined from directional data (e.g., polar θ and azimuthal ϕ angles in the direction of radar transmission) and distance data (e.g., radial distance R determined from the ToF of radar signals). Similarly, the low-level data can include a Doppler data (frequency shift) map, $V(x_1,x_2,x_3)$ identifying a radial velocity of reflecting objects, for various spatial points $\{x_j\}$ based on detected Doppler shift Δf of the frequency of the reflected radar signals, V=λΔf/2, where λ is the radar wavelength, with positive values Δf>0 associated with objects that move towards radar 114 (and, therefore, the AV) and negative values Δf<0 associated with objects that move away from radar 114. In some implementations, e.g., in driving environments where objects are moving substantially within a specific plane, the radar intensity map and the Doppler map can be defined using two-dimensional coordinates, such as the radial distance and azimuthal angle: $I(R,\phi)$, $V(R,\phi)$.

An additional output of radar data acquisition module 210 can include high-level radar data, which can be derived from processing of the low-level data, e.g., using a constant false alarm rate (CFAR) detection module. For example, radar data acquisition module 210 can identify locations of local maxima of the intensity $I(R,\phi)$ and output the list of the local maxima (peaks), which can be indexed by the coordinates of the maxima $R_i$, $\phi_i$. Each data entry on the list is referred herein as a radar return point or simply as a return point. Each return point can include the peak value of the intensity $I_i$ and the radial velocity $V_i$ determined from the Doppler shift of the respective radar reflection (e.g., a front bumper of a car, a door of the car, a stop sign, etc.). Accordingly, the list of return points can include multiple sets of data, $\{R_i, \phi_i, I_i, V_i\}$ which can further be indexed by a timestamp of the respective radar frame. Each frame can be associated with one period of a scanning operation of the radar, e.g., a full 360-degree view or any other spatial sector of observation assigned to the radar.

A camera image acquisition module 212 can acquire a sequence of images, which can be similarly identified with timestamps. Each image can have pixels of various intensities of one color (for black-and-white images) or multiple colors (for color images). Images acquired by camera image acquisition module 212 can be panoramic images or images depicting a specific portion of the driving environment, such as a large (e.g., panoramic) image segmented into smaller images.

An object identification module 220 can process outputs of radar data acquisition module 210 and camera image acquisition module 212. The data provided to the object identification module 220 can correspond to multiple objects in the environment. Some of the radar return points and groups of return points (herein called blobs) can be spurious returns that are caused by radar signal reflections, radar signal noise, or some combinations thereof. Object identification module 220 can differentiate genuine radar returns from spurious returns. In some implementations, object identification module 220 can process radar data corresponding to a large portion of the radar frame (e.g., up to the full size of the available frame) or radar data obtained for any smaller portion of the radar frame that can include one or several return points and/or blobs. Likewise, object identification module 220 can process one or more camera images, such as large global multi-object images or local few-object images (e.g., cropped from large images). Object identification module 220 can further use, as an additional input, the list of high-level return points. The input data can be processed by RVM 132, which may include one or more MLMs. RVM 132 can determine a probability that the identified high-level radar return points and blobs of points are associated with actual objects in the driving environment or represent spurious returns associated with ghost objects or other artifacts. MLMs deployed by RVM 132 can include decision-tree algorithms, support vector machines, deep neural networks, and the like. Deep neural networks can include convolutional neural networks, recurrent neural networks (RNN) with one or more hidden layers, fully connected neural networks, long short-term memory neural networks, Boltzmann machines, and so on.

The perception system can also include object tracking module 230 that can receive radar returns classified, by RVM 132, as real objects. Object tracking module 230 can also receive (as illustrated by the upper dashed arrow) high-level radar data directly from radar data acquisition module 210. More specifically, based on radar frame A, RVM 132 can identify a specific radar blob as corresponding to a real object (e.g., a motorcycle or a passenger car). Subsequently, object tracking module 230 can monitor motion of the identified blob using additional radar frames B, C, etc. Tracking can be performed by monitoring coordinates of the blob (e.g., geometric center-of-mass coordinates of the blob, the blob's bounding box, etc.) and velocity (e.g., based on both the radial Doppler-detected velocity and velocity computed from the coordinates). For example, object tracking module 230 can determine that the distance to the object at time $t_A$ of frame A is $R(t_A)$ while the radial velocity is $V_r(t_A)$. Correspondingly, object tracking module 230 can predict that the distance to the object at the time $t_B$ of frame B will be R $(t_A)-V_r(t_A)\cdot(t_B-t_A)$. Object tracking module 230 can subsequently receive frame B radar data and confirm that the blob has moved in agreement with the prediction and can further correct the location of the blob, based on the new radar data from frame B. Additionally, based on a new Doppler data for frame B, object tracking module 230 can make a further prediction, e.g., for the location of the blob at time $t_C$ of frame C.

In some implementations, object tracking module 230 can perform additional (e.g., periodic) validation of the tracked blob using low-level radar data. For example, at time $t_D$ of validation, object tracking module 230 can acquire low-level data corresponding to frame D. Object tracking module 230 can segment out a portion of low-level data that includes the blob being tracked. Object tracking module 230 can further acquire a camera image with the same timestamp $t_D$ (or some other suitable image, e.g., an image with a timestamp that is closest to $t_D$) and segment out a patch of the acquired image with the location that approximately corresponds to the tracked radar blob's bounding box. Object tracking module 230 can then provide the portion of the low-level radar data and the patch of the camera image to RVM 132 for validation.

RVM 132 can process the provided data, similarly to how the initial data of frame A was processed, and can return the updated probability that the blob corresponds to a real object. If the returned probability is at or above a first threshold probability $p_1$ (e.g., 85%, 90%, etc.), object tracking module 230 can determine with high confidence that the blob being tracked is still associated with the real object. Object tracking module 230 can continue tracking the object until the object is beyond a predetermined distance of monitoring (which can depend on the speed and/or type of the identified object and can be different for a truck than for a pedestrian) while performing periodic verifications with RVM 132, e.g., every n-th radar frame (and/or camera image). If the probability is below the first threshold probability $p_1$, but at or above the second threshold probability $p_2$ (e.g., 65%, 70%, etc.), object tracking module 230 can determine the status of the tracked object as uncertain and place the object for validation every m-th radar frame (or camera image), where m<n. If it is determined by RVM 132 that the probability is below the second threshold probability $p_2$, object tracking module 230 can conclude that the blob being tracked is not associated with a real object and can stop tracking the blob. In such instances, object identification module 220 can repeat the determination from the beginning, as described above, e.g., by receiving a new frame of the low-level radar data and new camera images of an expanded region of space and identifying real radar returns within the expanded region.

Tracking data generated by object tracking module 230 can be provided to AVCS 140. AVCS 140 evaluates the trajectories of the objects being tracked and determines whether to modify the current driving trajectory of the AV in view of the location and speed of the tracked objects. For example, if a tracked car is within a certain distance from the AV, the AVCS 140 can slow the AV down to a speed that ensures that the car can be safely avoided. Alternatively, AVCS 140 can change lanes, if an adjacent lane is free from obstructions, or perform some other driving maneuver.

RVM 132 can be trained using actual camera images and radar data that have been annotated with ground truth, which can include correct identification of radar returns and blobs of radar returns as real of spurious, e.g., based on a human input and/or lidar-based identification. Training can be performed by a training engine 242 hosted by a training server 240, which can be an outside server that deploys one or more processing devices, e.g., central processing units (CPUs), graphics processing units (GPUs), etc. In some implementations, one or more models of RVM 132 can be trained by training engine 242 and subsequently downloaded onto the perception system 130 of the AV 100. RVM 132, as illustrated in FIG. 2, can be trained using training data that includes training inputs 244 and corresponding target outputs 246 (correct matches for the respective training inputs). During training of RVM 132, training engine 242 can find patterns in the training data that map each training input 244 to the target output 246.

Training engine 242 can have access to a data repository 250 storing multiple camera images 252 and instances of high-level and low-level radar data 254 for actual driving situations in a variety of environments. During training, training engine 242 can select (e.g., randomly), as training data, a number of camera images 252 and sets of radar data 254. Training data can be annotated with correct radar return identifications. In some implementations, annotations can be made by a developer before the annotated data is placed into data repository 250. Annotated training data retrieved by training server 240 from data repository 250 can include one or more training inputs 244 and one or more target outputs 246. Training data can also include mapping data 248 that maps training inputs 244 to the target outputs 246. In some implementations, mapping data 248 can identify a radar blob with an object in a camera image. The mapping data 248 can include an identifier of the training data, location of the object, size of the object, speed and direction of motion of the object, type of the object, and other suitable information. In some implementations, training can be performed using mapping data that is unannotated. More specifically, training engine 242 can include object identification processing (e.g., neural network-based object identification), which can use machine-learning models trained in object identification. For example, training camera images can be input into object identification processing to determine whether the training camera images 1) depict actual objects that are capable of generating the training radar data, 2) depict no objects, or 3) depict images of other objects, such as vehicles or structures, that are likely to generate fake radar reflections. The training camera images annotated with the outputs of the object identification processing can then be used as ground truth in training of RVM 132.

During training of RVM 132, training engine 242 can change parameters (e.g., weights and biases) of various models of RVM 132 until the models successfully learn how to predict correct validation of radar detections (target outputs 246). In some implementations, different models of RVM 132 (e.g., camera model, radar model, fusion model, etc., as described below in conjunction with FIG. 5) can be trained separately. In some implementations, various models of RVM 132 can be trained together (e.g., concurrently). Different models can have different architectures (e.g., different numbers of neuron layers and different topologies of neural connections) and can have different settings (e.g., activation functions, etc.).

The data repository 250 can be a persistent storage capable of storing radar data, camera images, as well as data structures configured to facilitate accurate and fast validation of radar detections, in accordance with implementations of the present disclosure. The data repository 250 can be hosted by one or more storage devices, such as main memory, magnetic or optical storage based disks, tapes or hard drives, NAS, SAN, and so forth. Although depicted as separate from training server 240, in an implementation, the data repository 250 can be a part of training server 240. In some implementations, data repository 250 can be a network-attached file server, while in other implementations, data repository 250 can be some other type of persistent storage such as an object-oriented database, a relational database, and so forth, that can be hosted by a server machine or one or more different machines accessible to the training server 240 via a network (not shown in FIG. 2).

Figure 3:
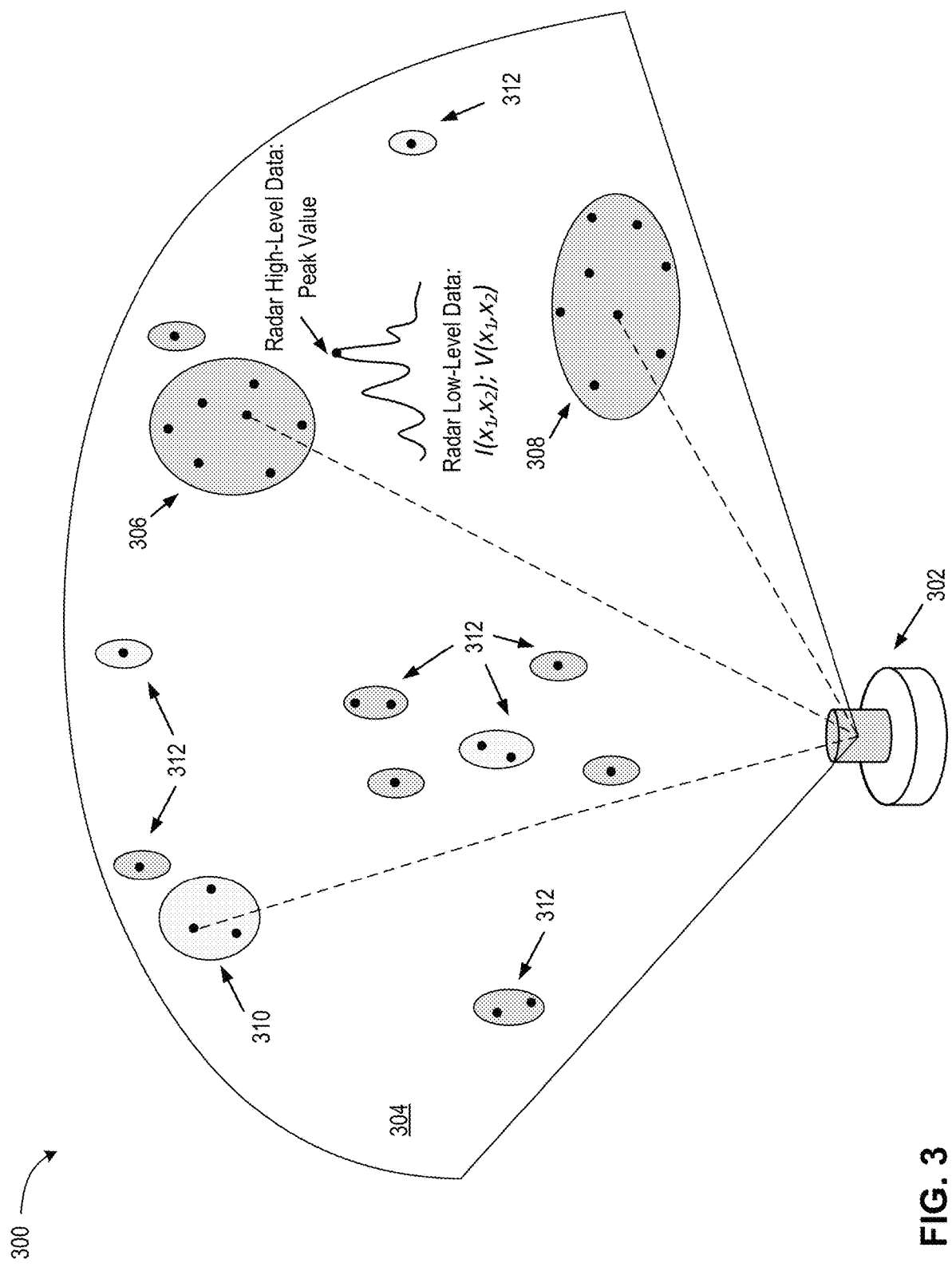
FIG. 3 is a schematic illustration of radar data obtained by a sensing system of an autonomous vehicle and used as an input into radar-data validation module (RVM), in accordance with some implementations of the present disclosure.

FIG. 3 is a schematic illustration of radar data 300 obtained by a sensing system of an autonomous vehicle and used as an input into radar-data validation module (RVM), in accordance with some implementations of the present disclosure. Radar data 300 can be obtained by a radar sensor 302, which can be a part of radar 114 of FIG. 1. Radar sensor 302 can be mounted on any suitable part (roof, bumper, mirrors, etc.) of an AV. Radar sensor 302 can scan an outside environment and detect returns (reflections) of transmitted signals by objects in the outside environment. A portion 304 of a view of the radar sensor 302 is shown in FIG. 1. The view can be three-dimensional, indexed by any suitable coordinates, e.g., $x_1$, $x_2$, $x_3$, which can be Cartesian coordinates, spherical coordinates, and so on. In some implementations, the view can be a two-dimensional projection by the three-dimensional view; the projection been indexed by (e.g., horizontal) coordinates $x_1$, $x_2$. Radar data 300 provided to RVM (e.g., RVM 132) can include both the high-level radar data and the low-level radar data. The high-level radar data, as used in modern radar devices, may include information associated with maxima of reflected radar signals, such as peak intensity, coordinates of the reflected surface (e.g., determined from directional and ToF data), velocity of the reflecting surface (determined from Doppler data), and so on. Peak reflections are indicated in FIG. 3 as black dots (return points). Some of the return points can be located sufficiently close to each other, or have similar values of velocity, to be treated as joint blobs (clusters of points). For example, shown in FIG. 3 are multi-point blobs 306, 308, and 310. In some implementations, identification of blobs can be performed based on a single radar frame using various clustering algorithms and based on proximity of return points in space and proximity of their velocity values. In some implementations, identification of blobs can be performed using multiple radar frames and can be based on the motion of the candidate blobs, e.g., performed using iterative closest point (ICP) algorithms or other mapping algorithms. Various unassociated returns 312 can be spaced sufficiently far from each other (or move with sufficiently different velocities) and thus can be identified as not being a part of any cluster. Some of the blobs 306, 308, and 310 or unassociated returns 312 can correspond to real objects whereas some of these blobs and returns can be spurious and can originate from reflections off a wall, a building, a parked vehicle, and so on. Some of the spurious blobs and returns can be caused by noise in the radar signal generation, transmission, reception, and/or processing.

In addition to high-level radar return points, radar data 300 can include low-level radar data, such as a three-dimensional radar intensity map $I(x_1, x_2, x_3)$ or a two-dimensional radar intensity map $I(x_1, x_2)$. The radar intensity map may be obtained from the raw radar data. The raw radar data can be processed, e.g., denoised, pixelated, downsampled, upsampled, and the like, to obtain the low-level radar data. Similarly, radar data 300 can include (three-dimensional or two-dimensional) Doppler shift map $\Delta f(x_1, x_2)$ or, equivalently, a radial velocity map $V_r(x_1, x_2) = \lambda \Delta f(x_1, x_2)/2$. The intensity map $I(x_1, x_2, x_3)$ and the radial velocity map $V_r(x_1, x_2, x_3)$ can be provided (e.g., by radar data acquisition module 210) for the entire portion 304 of the radar view or for any set of sub-regions of the portion 304. In some implementations, the radar data 300 can be provided for a predetermined neighborhood of each return point/blob of the list of return points/blobs contained in the high-level radar data. As one illustrative example, radar data acquisition module 210 can identify blobs 306, 308, and 310 as candidates that correspond to potential objects in the portion 304 of the radar view. The high-level data can identify and list return points for each blob (including coordinates, peak intensity, associated Doppler shift, etc.) and, optionally, bounding boxes of some or all blobs. Bounding boxes can be rectangular bounding boxes, ellipsoidal bounding boxes, or boxes of any other suitable shape identified based on the radar data. The low-level data can provide more detailed information about the actual distribution of the intensity/Doppler shift of the radar signals in the vicinity of the blobs or within the broader (e.g., entire) radar view.

Figure 4:
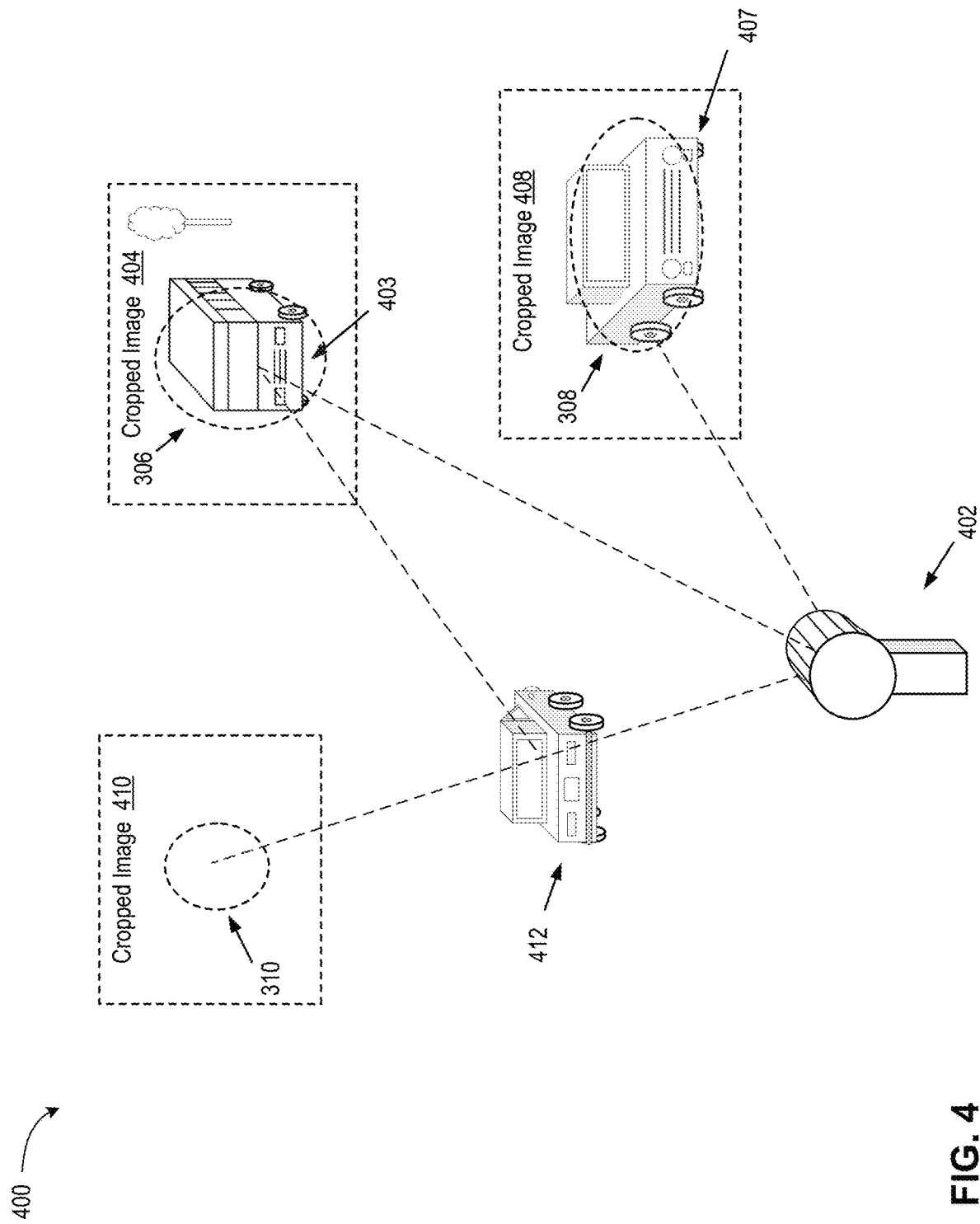
FIG. 4 is a schematic illustration of a camera image obtained by a sensing system of an autonomous vehicle and used as an input into RVM, in accordance with some implementations of the present disclosure.

FIG. 4 is a schematic illustration of a camera image 400 obtained by a sensing system of an autonomous vehicle and used as an input into the radar-data validation module, in accordance with some implementations of the present disclosure. Camera image 400 can correspond to the same portion 304 of the outside environment as sensed with radar data 300 in FIG. 3. Camera image 400 can be an individual image obtained by camera 402 (e.g., camera 118 of AV 100 in FIG. 1), an image in a sequence of images, a single frame of a video obtained by camera 402, and the like. Camera image 400 can depict a bus 403, cars 407 and 412, and any number of other objects, such as building, bridges, road signs, road markings, etc., not depicted explicitly in FIG. 4. One or more objects depicted in FIG. 4 can be moving, e.g., bus 403 and car 407 can be moving, whereas other objects can be stationary (stopped or parked), e.g., car 412 can be parked. Camera image 400 can include any additional objects not explicitly depicted in FIG. 4, such as trees, road signs, bridges, overpasses, ramps, buildings, and so on. Camera image 400 can contain accurate information about angular locations of the objects but can be less informative regarding the distance to the objects and the velocity of the objects. Some portions of the image 400 can include the same objects as sensed by the radar data 300. As depicted schematically, a radar blob 306 can be associated with bus 403 and radar blob 308 can be associated with car 407. As illustrated, blobs 306 and 308 can be produced by real objects (bus 403 and car 407). Some of the radar blobs can be spurious blobs that are not associated with any real objects. For example, blob 310 can be produced by radar signals that are reflected from bus 403 and parked car 412.

In some implementations, the entire camera image 400 can be used as an input into RVM 132. In some implementations, portions of the camera image 400 can be used as such inputs. The portions can be cropped based on locations of the blobs (e.g., as identified by high-level radar data). For example, cropped image 404 can be a portion of the camera image 400 around blob 306. Similarly, cropped image 408 can be a portion of the camera image 400 around blob 308, and cropped image 410 can be a portion of the camera image 400 around blob 310. As illustrated in FIG. 4, cropped image 410 can lack any actual objects that would be capable of generating radar blob 310 or can depict objects (e.g., bushes, posts) whose radar returns would be inconsistent with the radar blob 310.

Figure 5:
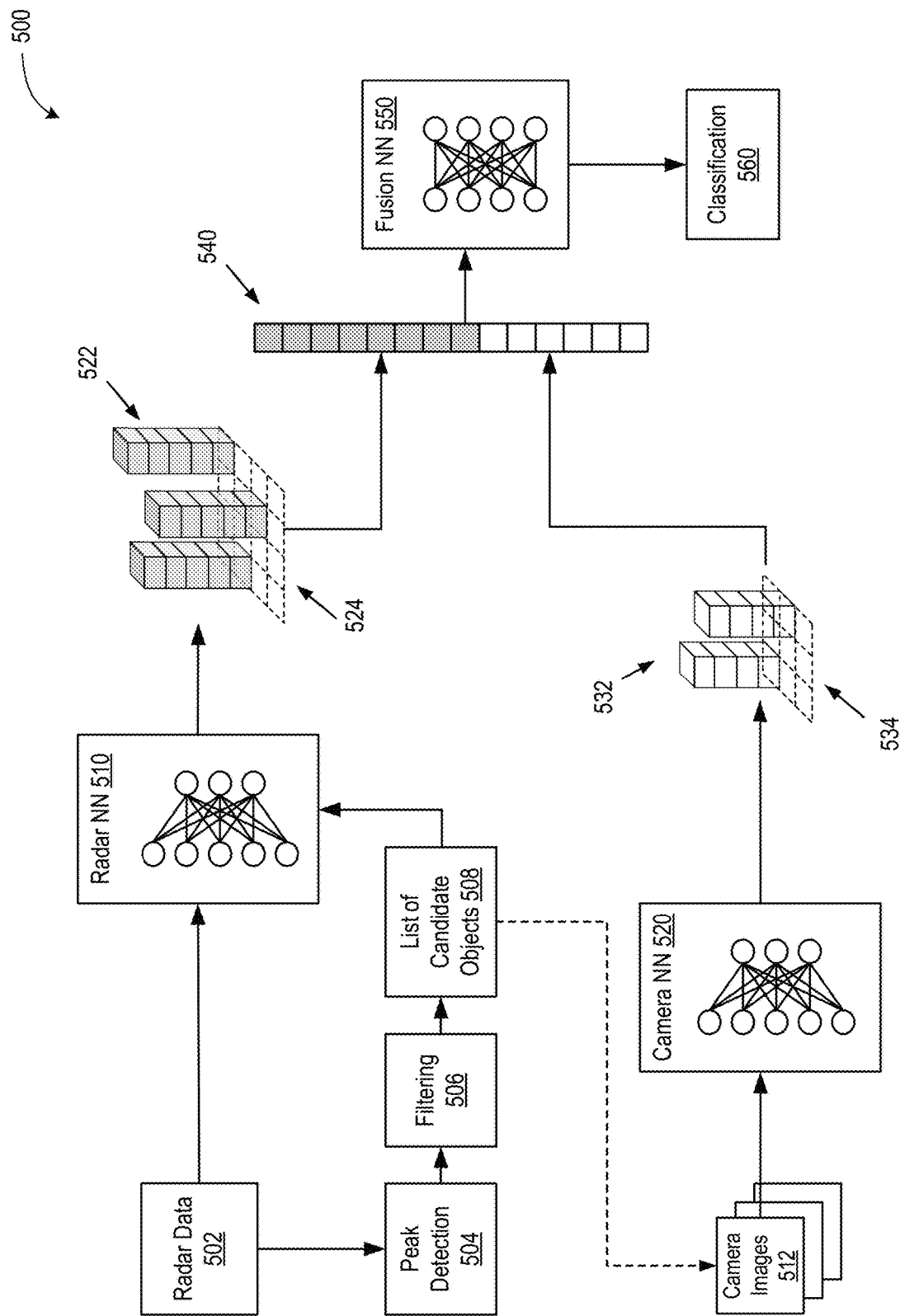
FIG. 5 is a schematic diagram illustrating an example RVM that uses one or more machine-learning models for fast and reliable verification of radar detection of objects, in accordance with some implementations of the present disclosure.

FIG. 5 is a schematic diagram illustrating an example radar-data validation module 500 that uses one or more machine-learning models for fast and reliable verification of radar detection of objects, in accordance with some implementations of the present disclosure. RVM 500 can be RVM 132 of the perception system 130 depicted in FIG. 1. In one implementation, RVM 500 can include multiple neural networks (NNs), including radar NN 510, camera NN 520, fusion NN 530, and/or other networks not explicitly depicted in FIG. 5. Although depicted as separate blocks in FIG. 5, various neural networks of RVM 500 can be parts of the same NN, which can be trained jointly. Neurons in the neural networks are associated with learnable weights and biases. The neurons can be arranged in layers. Some of the layers can be hidden layers. Each of the NNs 510, 520, and 530 can include multiple hidden neuron layers and can be configured to perform one or more functions that facilitate validation of radar detections.

The input into RVM 500 can include a radar data 502. Radar data 502 can be low-level data which can include three-dimensional (3D) intensity of reflected radar signals $I(x_1, x_2, x_3)$ or a two-dimensional (2D) projection of the intensity, $I(x_1, x_2)$. The 2D intensity can represent a specific slice of the 3D intensity for a specific height $x_3 = h$ above the ground, e.g., $I(x_1, x_2, h)$, or a maximum value with respect to the vertical coordinate, $I(x_1, x_2) = \max\{I(x_1, x_2, x_3): x_3\}$, or an average value of $I(x_1, x_2, x_3)$ within some interval of heights, $x_3 \in (a,b)$, or some other suitable value. Similarly, in some implementations, a 3D-dimensional Doppler shift or velocity $V(x_1, x_2, x_3)$ or its 2D projection (e.g., determined as described above fin relation to the intensity I) can be input into radar NN 510. For example, an N×M array of pixels, each having size (area) $\Delta x_1 \times \Delta x_2$ can be input into radar NN 510, with pixel (jk) being associated with the respective intensity $I_{jk}$ of the radar return (e.g., an average or maximum intensity of the pixel) and velocity $V_{jk}$ (e.g., an average or maximum velocity of the pixel), wherein $j \in [1,N]$ and $k \in [1, M]$. It should be understood that coordinates $(x_1, x_2, x_3)$ or $(x_1, x_2)$ are not limited to Cartesian coordinates and can include any suitable system of coordinates, e.g., a spherical coordinate system, cylindrical coordinate system, elliptical coordinate system, polar coordinate system, and so on. In some implementations, a coordinate system can be a non-orthogonal coordinate system, e.g., an affine coordinate system.

A second input into radar NN 510 can include high-level radar data, such as the list of candidate objects 508, which can be obtained from radar data 502 by identifying (at block 504) local peak intensities (e.g., maxima of 3D or 2D intensity I) and associated with the local peak intensities coordinates of the reflecting surfaces and Doppler velocities $V_i$. The high-level radar data may be produced by CFAR module processing raw radar data (or low-level radar data). In some implementations, in addition to the local maxima, other points (pixels) can be added to the list of candidate objects 508, such as points whose intensity values are above a predetermined threshold, e.g., at least a certain percentage (e.g., 75%, 80%, etc.) of the peak value or a certain threshold magnitude of the reflected intensity. The threshold magnitude can be a function of the distance travelled by the radar signal, the threshold magnitude taking into account that the strength of the reflected radar signal decreases with the distance travelled (e.g., as the inverse fourth power of the distance). As a result, a whole cluster of closely located return points (a blob) can correspond to reflections from a single (real or spurious) object.

In some implementations, the list of candidate objects 108 can be input into a set of the nodes of the input layer of radar NN 510 that is different from a set of the nodes that receive the (low-level) radar data 502. In some implementations, the two inputs (radar data 502 and the list of candidate objects 508) can be received by the same set of input nodes. More specifically, each pixel (jk) can be further associated with a hit value, which can be a binary value, e.g., with value 1 indicating a positive return of the radar signal (e.g., above a threshold level associated with noise) and value 0 indicating an absence of a return. For example, pixels that belong to blobs 306, 308, 310 (and various blobs or individual returns 312) of FIG. 3 can have hit value 1 whereas pixels that are outside the blobs can have hit value 0.

In some implementations, the radar returns identified by CFAR module can further undergo statistical filtering (block 506), e.g., using a Kalman filter algorithm, for more accurate identification of locations and velocities of radar returns and blobs. The Kalman filter algorithm can track a motion of the blob over multiple radar frames. For example, based on the estimate of the location/velocity of the blob for a current frame, the Kalman filter algorithm can predict location/velocity of the blob for a subsequent frame, obtain new radar data for the subsequent frame, update covariance matrices for the location/velocity of the blob and for the measurement noise, and make a more accurate estimate of the current location/velocity of the blob. This process can be repeated as long as the blob is being tracked.

Input into camera NN 520 can include one of more camera images 512. Camera images 512 can be in any suitable digital format (JPEG, TIFF, GIG, BMP, CGM, SVG, and so on). In some implementations, camera images 512 can include a large image that depicts the same (or approximately the same) region of the driving environment as covered by radar data 502. In some implementations, camera images 512 can include portions (patches) of the larger image. As depicted by the dashed arrow, patches can be cropped from the larger image based on the list of candidate objects. For example, each of the camera images 512 can depict a portion of the driving environment that includes a direction towards the blob associated with one of the candidate objects. The camera patch can be of a predetermined size; for example, if a blob has angular size $\alpha$, a cropped camera image can have angular size $\beta = C \cdot \alpha$, where C can be a constant, e.g., 3, 5, 20, or any other value that can be determined empirically.

Each of camera images 512 can include a number of pixels. The number of pixels can depend on the resolution of the image. Each pixel can be characterized by one or more intensity values. A black-and-white pixel can be characterized by one intensity value representing the brightness of the pixel, with value 1 corresponding to a white pixel and value 0 corresponding to a black pixel (or vice versa). The intensity value can assume continuous (or discretized) values between 0 and 1 (or between any other chosen limits, e.g., 0 and 255). Similarly, a color pixel can be represented by more than one intensity value, e.g., by three intensity values (e.g., if the RGB color encoding scheme is used) or four intensity values (e.g., if the CMYK color encoding scheme is used). Each of the camera images 512 can be preprocessed prior to being input into camera NN 520, e.g., downscaled (with multiple pixel intensity values combined into a single pixel value), upsampled, filtered, denoised, and the like.

The radar NN 510 processes radar data 502 (and the list of candidate objects 508) and outputs radar feature vectors 522 (depicted schematically as columns) that characterizes local properties of the radar intensity while taking into account a broader context of the entire radar data 502. In some implementations, radar NN 510 can include a number of convolutional layers to extract local and global context of radar data 502. Convolutional layers can use any suitable parameters, including kernel/mask size, kernel/mask weights, sliding step size, and the like. Convolutional layers can alternate with padding layers and can be followed with one or more pooling layers, e.g., maximum pooling layers, average pooling layers, and the like. Some of the layers of radar NN 510 can be fully-connected layers. In some implementations, radar NN 510 can be fully convolutional. The number of nodes in the output layer of radar NN 510 can be equal to the total number of elements in all output radar feature vectors 522. In some implementations, the output of radar NN 510 can include an array 524 of n×m radar superpixels, each radar superpixel associated with a respective radar feature vector 522. The size of the array can be smaller than the size N×M of the array of pixels of radar data 502. Each of the radar superpixels of the array 524 can correspond to multiple pixels of radar data 502. The radar feature vectors 522 can be an output of nodal operations involving learned weights and biases of radar NN 510 determined during training.

Similarly, the camera NN 520 can process camera images 512 and output an array 534 of n'×m' camera superpixels, each camera superpixel associated with a camera feature vector 532. Each camera superpixel can corresponding to multiple pixels of camera images 512. In some implementations, the dimensions of the array 534 may be different from the dimensions n×m of the array 524.

The output of radar NN 510 and camera NN 520 can be joined (e.g., concatenated) into a combined feature vector 540. For example, object identification module 220 of FIG.

2 can identify, for a specific radar blob (or return point), a radar superpixel of the array 524 that corresponds to a region containing the blob. The object identification module 220 can select a radar feature vector 522 associated with the identified superpixel. The object identification module 220 can then translate the coordinates of the radar 114 to the coordinates of the camera 118 and identify the camera superpixel of the array 534 corresponding to the region of space occupied by the blob. The camera feature vector 532 associated with the identified camera superpixel (white squares) can then be concatenated with the selected radar feature vector 522 (shaded squares) to obtain the combined feature vector 540.

The combined feature vector 540 can be input into a fusion NN 550. In some implementations, fusion NN 550 can be a fully-connected neural network. In some implementations, fusion NN 550 can include one or more convolutional layers. Fusion NN 550 can output a classification 560 that includes a probability that the radar blob corresponds to a real object, e.g., 30%, 65%, 90%, etc. In some implementations, classification 560 can further include a confidence level in the output probability. The confidence level can also be a percentage value (e.g., 80% confidence) or a value within some other scale (e.g., 1-5 or any other scale). Classification 560 can be determined for each candidate object, e.g., by the fusion NN 530 processing consecutively corresponding pairs of radar feature vectors 522 and associated with them camera feature vectors 532.

Training of radar NN 510, camera NN 520, and fusion NN 530 can be performed using radar data 502 and camera images 512 of actual driving environments. Training can be performed using one or more training sets. Each training set can include a camera image of a region of a driving environment and a corresponding to this region radar data. Each training set can include one or more real radar detections and one or more spurious radar detections. During training, incorrect output classifications of spurious radar detections as real and real radar detections as spurious can be used to adjust weights and biases of radar NN 510, camera NN 520, and fusion NN 530 by backpropagating errors through the neuron layers of the NNs 510-530. More specifically, weights and biases of NNs 510-530 can be modified until a given radar detection (candidate object) within a specific training set is classified correctly. The process can be repeated with other radar detections of the same training set. Subsequently, a new training set can be selected and various radar detections of the new set can be classified with NN parameters being changed again until a successful classification of at least a target portion of radar detections in the new training set is achieved. This training process can continue until a target success rate (e.g., 90%, 95%, etc.) of reliable classification of radar detections in training sets is reached. In some implementations, the target success rate can be determined based on a set of testing images previously not seen by NNs 510-530.

Multiple variations of RVM 500 can be implemented that differ from RVM 500 in one or more aspects. In some implementations, radar NN 510 receives no high-level radar data (e.g., no list of candidate objects 508) and performs identification of candidate objects based directly on low-level radar data 502. More specifically, each of the output feature vectors 522 can include a component that has hit value 1, if radar NN 510 has identified the corresponding radar superpixel as containing a candidate object, and hit value 0, if radar NN 510 has not identified the corresponding superpixel as containing a candidate object. Subsequently, object identification module 220 can select radar feature vectors 522 that have hit value 1, concatenate the selected radar feature vectors 522 to respective camera feature vectors 532 and input each pair of concatenated joint feature vectors 540 into fusion NN 550. In some implementations, radar data 502 covers a large region of space (e.g., a panoramic frame of radar scanning or a substantial portion thereof containing multiple objects/radar returns) and camera image 512 sis similarly a large (e.g., panoramic) image of space. In some implementations, radar data 502 covers a large region of space (e.g., a 90° azimuthal angle region, a 150° azimuthal angle region, and so on) while camera images 512 are cropped from a larger image, with each cropped portion depicting a specific neighborhood of directions near a direction identified in the list of candidate objects 508. In some implementations, both the radar data 502 and camera images 512 are cropped from larger radar data and a larger image based on the list of candidate objects 508. Each cropped radar data and each cropped image can correspond to a specific range of angles (or solid angles) around the direction to the respective candidate object.

Figure 6:
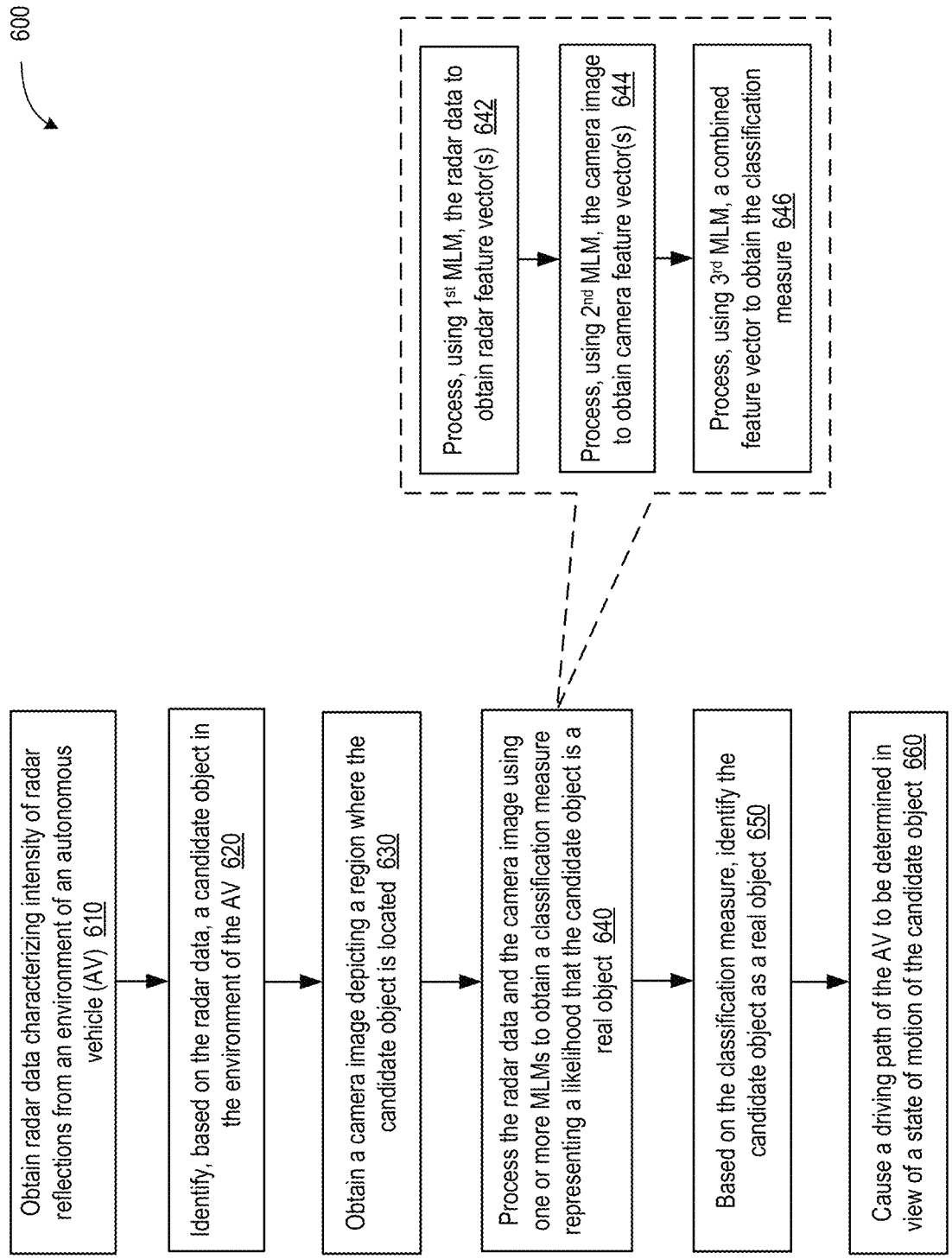
FIG. 6 illustrates an example method of verification of radar detections using machine-learning models in autonomous vehicle applications, in accordance with some implementations of the present disclosure.

FIG. 6 illustrates an example method 600 of verification of radar detections using machine-learning models in autonomous vehicle applications, in accordance with some implementations of the present disclosure. A processing device, having one or more processing units (CPUs), and or graphics processing units (GPU) and memory devices communicatively coupled to the CPU(s) and/or GPUs, can perform method 600 and/or each of its individual functions, routines, subroutines, or operations. The processing device executing method 600 can perform instructions issued by various components of the perception system 130 of FIG. 1, e.g., RVM 132. Method 600 can be directed to systems and components of an autonomous driving vehicle, such as the autonomous vehicle 100 of FIG. 1. Method 600 can be used to improve performance of the autonomous vehicle data processing system 120 and/or the autonomous vehicle control system 140. In certain implementations, a single processing thread can perform method 600. Alternatively, two or more processing threads can perform method 600, each thread executing one or more individual functions, routines, subroutines, or operations of the methods. In an illustrative example, the processing threads implementing method 600 can be synchronized (e.g., using semaphores, critical sections, and/or other thread synchronization mechanisms). Alternatively, the processing threads implementing method 600 can be executed asynchronously with respect to each other. Various operations of method 600 can be performed in a different order compared with the order shown in FIG. 6. Some operations of method 600 can be performed concurrently with other operations. Some operations can be optional.

At block 610, method 600 can include obtaining, e.g., by a processing device of the data processing system of an AV, a radar data characterizing intensity of radar reflections from an environment of the AV. In some implementations, the radar data can include a plurality of intensity values, e.g., 3D intensity map $I(x_1, x_2, x_3)$. In some implementations, the radar data can include a two-dimensional projection $I(x_1, x_2)$ of the intensity of radar reflections, $I(x_1, x_2, x_3)$. The plurality of intensity values can be discretized (e.g., pixelated). Each of the plurality of intensity values can be associated with a respective pixel of a plurality of pixels of the radar data. Each pixel can be a two-dimensional pixel or a three-dimensional pixel (e.g., voxel) and can include a variety of low-level radar information. For example, each pixel can include the location (e.g., coordinates) of a material surface (e.g., a door of a vehicle, a face of a road sign, etc.) of an object that reflects transmitted radar signals (if the object is real) or an apparent location of the reflecting surface (if the object is spurious). Each pixel can further include Doppler shift data representative of the velocity of the reflecting surface (or the velocity of the apparent reflecting surface). Each pixel can further include a location (e.g., three-dimensional coordinates $x_1, x_2, x_3$ or two-dimensional coordinates $x_1, x_2$) of the reflecting surface (or the coordinates of the apparent reflecting surfaces). Additionally, the radar data can include a high-level data, such as an identification of one or more local maxima of the intensity of radar reflections (peak intensities) and, for each of the one or more local maxima, a corresponding spatial location of the (real or apparent) reflecting surface, a Doppler shift associated with the corresponding spatial location of the reflecting surface, and the like. In some implementations, the spatial locations referenced by the high-level radar information can be determined using statistical filtering (e.g., Kalman filtering) of information obtained from multiple frames of the radar data.

At block 620, method 600 can continue with the processing device identifying, based on the radar data, a candidate object in the environment of the AV. For example, the candidate object can be identified based on one or more radar returns having intensity above a certain threshold associated with reflections from objects in the driving environment. At block 630, method 600 can continue with the processing device obtaining a camera image that depicts a region where the (real or spurious) candidate object is (actually or apparently) located. The camera image can be taken of a portion of the environment that includes the candidate object but need not be identical to the portion of the environment sensed with the radar data. In some implementations, the camera image can be an image cropped from a larger image, based on the location of the candidate object.

At block 640, method 600 can continue with processing the radar data and the camera image using one or more machine-learning models (MLMs) to obtain a classification measure. The classification measure can represent a likelihood that the candidate object is a real object in the environment of the AV. In some implementations, the classification measure can be a probability that the first and second hypothetical objects are the same. In some implementations, the classification measure can be a binary value (e.g., 0 or 1, YES or NO, etc.). The callout portion of FIG. 6 illustrates operations that can be performed as part of block 640. More specifically, at block 642, method 600 can include processing, using a first MLM of the one or more MLMs, the radar data to obtain one or more radar feature vectors (e.g., radar feature vectors 522 in FIG. 5). At block 644, method 600 can include processing, using a second MLM of the one or more MLMs, the camera image to obtain one or more camera feature vectors (e.g., radar feature vectors 532). In some implementations, each of the first MLM and the second MLM can include one or more convolutional neuron layers. At block 646, method 600 can continue with processing, using a third MLM of the one or more MLMs, a combined feature vector to obtain the classification measure. The combined feature vector (e.g., combined feature vector 540) can include a first feature vector of the one or more radar feature vectors (e.g., a shaded portion of the combined feature vector 540). The first feature vector can characterize a portion of the radar data associated with the candidate object. The combined feature vector can further include a second feature vector of the one or more camera feature vectors (e.g., a white portion of the combined feature vector 540), the second feature vector characterizing a portion of the camera image associated with the candidate object. In some implementations, the third MLM can include one or more fully-connected neuron layers. It should be understood that each of the MLMs referenced above can be a part of the same model, with the first (second, third) MLM being a first (second, third) plurality of neural layers of the same neural network in which any or all neural layers are trained concurrently.

At block 650, the processing device performing method 600 can determine that the classification measure indicates that the first candidate object is a real object. At block 660, method 600 can continue with causing a driving path of the AV to be determined in view of a state of motion of the candidate object, based on the determination that the candidate object is real. The state of motion can include the location (coordinates) and velocity of the candidate object and can be determined, e.g., from ToF of the radar signals, from directional data for the radar signals, from the Doppler shift information carried by the radar signals, and so on. In some implementations, the state of motion is determined based on radar data from multiple frames (acquired at different times). The state of motion can further be determined by using Kalman filtering. Using the identified state of motion, the perception system of the AV can determine that the object is sufficiently close to the AV (and/or is moving with a substantial speed) to interfere with the driving path of the AV. The perception system can communicate this information to the control system (e.g., the AVCS 140). The control system can chart a new driving path (or modify the existing driving path) that avoids the object. The control system can implement the new driving path by outputting instructions to powertrain and steering 150, vehicle electronics 160, signaling 170, etc., to cause the AV to brake, change lanes, stop, back up, accelerate, and so on, and to ensure that the AV follows the determined driving path.

Figure 7:
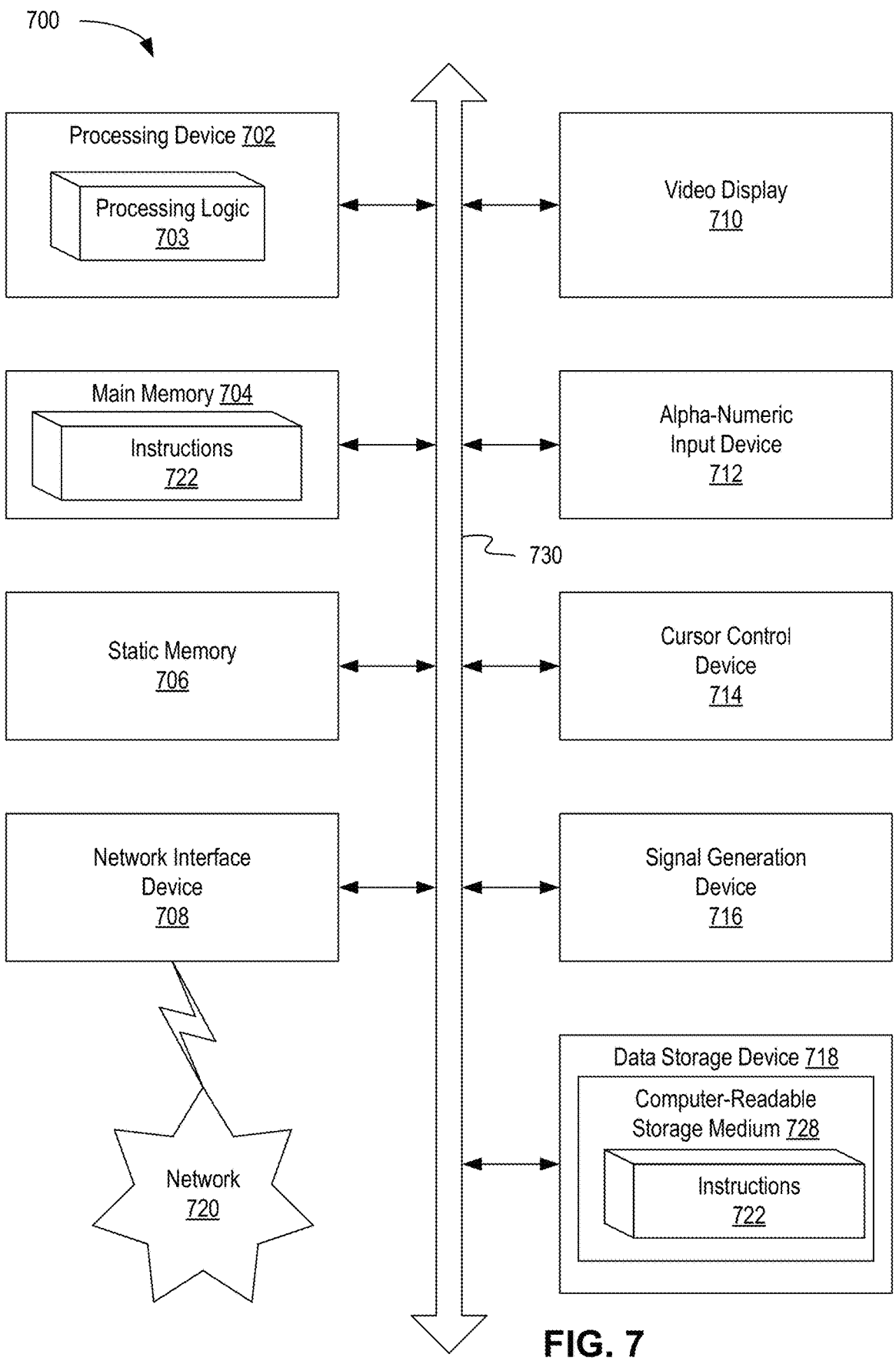
FIG. 7 depicts a block diagram of an example computer device capable of enabling fast and reliable object identification and tracking in autonomous driving environments, in accordance with some implementations of the present disclosure.

FIG. 7 depicts a block diagram of an example computer device 700 capable of enabling fast and reliable object identification and tracking in autonomous driving environments, in accordance with some implementations of the present disclosure, in accordance with some implementations of the present disclosure. Example computer device 700 can be connected to other computer devices in a LAN, an intranet, an extranet, and/or the Internet. Computer device 700 can operate in the capacity of a server in a client-server network environment. Computer device 700 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 700 can include a processing device 702 (also referred to as a processor or CPU), a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 718), which can communicate with each other via a bus 730.

Processing device 702 (which can include processing logic 703) represents one or more general-purpose processing devices such as a microprocessor, central processing unit, or the like. More particularly, processing device 702 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 702 can be configured to execute instructions performing method 600 of verification of radar detections using machine-learning models in autonomous vehicle applications.

Example computer device 700 can further comprise a network interface device 708, which can be communicatively coupled to a network 720. Example computer device 700 can further comprise a video display 710 (e.g., a liquid crystal display (LCD), a touch screen, or a cathode ray tube (CRT)), an alphanumeric input device 712 (e.g., a keyboard), a cursor control device 714 (e.g., a mouse), and an acoustic signal generation device 716 (e.g., a speaker).

Data storage device 718 can include a computer-readable storage medium (or, more specifically, a non-transitory computer-readable storage medium) 728 on which is stored one or more sets of executable instructions 722. In accordance with one or more aspects of the present disclosure, executable instructions 722 can comprise executable instructions performing method 600 of verification of radar detections using machine-learning models in autonomous vehicle applications.

Executable instructions 722 can also reside, completely or at least partially, within main memory 704 and/or within processing device 702 during execution thereof by example computer device 700, main memory 704 and processing device 702 also constituting computer-readable storage media. Executable instructions 722 can further be transmitted or received over a network via network interface device 708.

While the computer-readable storage medium 728 is shown in FIG. 7 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:
1. A system comprising:
a sensing system of an autonomous vehicle (AV), the sensing system configured to:
obtain a radar data characterizing intensity of radar reflections from an environment of the AV; and obtain a camera image depicting a region of the environment of the AV; and a perception system of the AV, the perception system configured to:
  identify, based on the radar data, a first candidate object and a second candidate object within the region of the environment of the AV;
  process the radar data and the camera image using one or more machine-learning models (MLMs) to determine that the first candidate object is associated with a first probability to be a real object in the environment of the AV and that the second candidate object is associated with a second probability to be a real object;
  determine, responsive to the first probability being above a threshold probability, that the first candidate object is a real object in the environment of the AV;
  determine, responsive to the second probability being below the threshold probability, that the second candidate object is a potential spurious object in the environment of the AV; and
  confirm, using additional radar data and one or more additional camera images, collected at one or more later times, that the second candidate object is a spurious object in the environment of the AV.

2. The system of claim 1, wherein to process the radar data and the camera image, the perception system is to:
  process, using a first plurality of neuron layers, the radar data to obtain a plurality of radar feature vectors;
  process, using a second plurality of neuron layers, the camera image to obtain a plurality of camera feature vectors; and
  process, using a third plurality of neuron layers, a plurality of combined feature vectors to obtain the first probability
  wherein the a first combined feature vector of the plurality of combined feature vectors comprises:
    a first radar feature vector of the plurality of radar feature vectors, the first radar feature vector characterizing a first portion of the radar data associated with the first candidate object, and
    a first camera feature vector of the plurality of camera feature vectors, the first camera feature vector characterizing a portion of the camera image associated with the first candidate object.

3. The system of claim 2, wherein the perception system is further configured to:
  cause a driving path of the AV to be determined in view of a state of motion of the first candidate object, wherein the state of motion of the first candidate object comprises one or more of a location of the first candidate object or a speed of the candidate object.

4. The system of claim 2, wherein to process the radar data and the camera image, the perception system is further configured to:
  process, using the third plurality of neuron layers, a second combined feature vector of the plurality of combined feature vectors to obtain the second probability, wherein the second combined feature vector comprises:
    a second radar feature vector of the plurality of radar feature vectors, the second radar feature vector characterizing a second portion of the radar data associated with the second candidate object, and
    a second camera feature vector of the plurality of camera feature vectors, the second camera feature vector characterizing a portion of the camera image associated with the second candidate object.

5. The system of claim 2, wherein each of the first plurality of neuron layers and the second plurality of neuron layers comprises one or more convolutional neuron layers and wherein the third plurality of neuron layers comprises one or more fully-connected neuron layers.

6. The system of claim 1, wherein the radar data comprises a plurality of intensity values, and wherein each of the plurality of intensity values is associated with a respective pixel of a plurality of pixels of the radar data.

7. The system of claim 6, wherein the radar data further comprises an identification of:
  one or more local maxima of the intensity of radar reflections, and
  for each of the one or more local maxima, a corresponding spatial location of a reflecting surface.

8. The system of claim 7, wherein the corresponding spatial location is determined using statistical filtering of information obtained from multiple frames of the radar data.

9. The system of claim 7, wherein the radar data further comprises:
  for each of the one or more local maxima, a Doppler shift associated with the corresponding spatial location of the reflecting surface.

10. The system of claim 1, wherein the radar data comprises a two-dimensional projection of the intensity of radar reflections.

11. A method comprising:
  obtaining, by a processing device, a radar data characterizing intensity of radar reflections from an environment of an autonomous vehicle (AV);
  obtaining, by the processing device, a camera image depicting at least a part of the environment of the AV;
  identifying, by the processing device and based on the radar data, a first candidate object and a second candidate object within the part of the environment of the AV;
  processing the radar data and the camera image using one or more machine-learning models (MLMs) to determine that the first candidate object is associated with a first probability to be a real object in the environment of the AV and that the second candidate object is associated with a second probability to be a real object;
  determining, responsive to the first probability being above a threshold probability, that the first candidate object is a real object in the environment of the AV;
  determining, responsive to the second probability being below the threshold probability, that the second candidate object is a potential spurious object in the environment of the AV; and
  confirming, using additional radar data and one or more additional camera images, collected at one or more later times, that the second candidate object is a spurious object in the environment of the AV.

12. The method of claim 11, further comprising:
  causing a driving path of the AV to be determined in view of a state of motion of the first candidate object, wherein the state of motion of the first candidate object comprises one or more of a location of the candidate object or a speed of the candidate object.

13. The method of claim 11, wherein processing the radar data and the camera image comprises:
  processing, using a first MLM of the one or more MLMs, the radar data to obtain one or more radar feature vectors;

processing, using a second MLM of the one or more MLMs, the camera image to obtain one or more camera feature vectors; and processing, using a third MLM of the one or more MLMs, a combined feature vector to obtain the first probability, wherein the combined feature vector comprises:

a first feature vector of the one or more radar feature vectors, the first feature vector characterizing a portion of the radar data associated with the first candidate object, and a second feature vector of the one or more camera feature vectors, the second feature vector characterizing a portion of the camera image associated with the first candidate object.

14. The method of claim 13, wherein each of the first MLM and the second MLM comprises one or more convolutional neuron layers and wherein the third MLM comprises one or more fully-connected neuron layers.

15. The method of claim 11, wherein the radar data comprises a plurality of intensity values, wherein each of the plurality of intensity values is associated with a respective pixel of a plurality of pixels of the radar data.

16. The method of claim 15, wherein the radar data further comprises an identification of:

one or more local maxima of the intensity of radar reflections, and for each of the one or more local maxima, a corresponding spatial location of a reflecting surface.

17. The method of claim 16, wherein the corresponding spatial location is determined using statistical filtering of information obtained from multiple frames of the radar data.

18. The method of claim 16, wherein the radar data further comprises:

for each of the one or more local maxima, a Doppler shift associated with the corresponding spatial location of the reflecting surface.

19. The method of claim 11, wherein the radar data comprises a two-dimensional projection of the intensity of radar reflections.

20. A autonomous vehicle comprising:

a sensing system, the sensing system to:

obtain a radar data characterizing intensity of radar reflections from an environment of the autonomous vehicle; and obtain a camera image depicting a region of the environment of the autonomous vehicle; and a perception system, the perception system to:

identify, based on the radar data, a first candidate object and a second candidate object within the region of the environment of the autonomous vehicle;

process, using one or more machine-learning models (MLMs), the radar data and the camera image to determine that the first candidate object is associated with a first probability to be a real object in the environment of the autonomous vehicle and that the second candidate object is associated with a second probability to be a real object;

determine, responsive to the first probability being above a threshold probability, that the first candidate object is a real object in the environment of the autonomous vehicle;

determine, responsive to the second probability being below the threshold probability, that the second candidate object is a potential spurious object in the environment of the autonomous vehicle; and confirm, using additional radar data and one or more additional camera images, collected at one or more later times, that the second candidate object is a spurious object in the environment of the autonomous vehicle.

* * * * *